United States Patent
Campbell et al.

(10) Patent No.: US 12,143,471 B2
(45) Date of Patent: Nov. 12, 2024

(54) PAIRING DEVICES FOR ENHANCED SECURITY

(71) Applicant: INTERNATIONAL BUSINESS MACHINES CORPORATION, Armonk, NY (US)

(72) Inventors: Eric J. Campbell, Rochester, MN (US); Christopher Steffen, Rochester, MN (US); Chad Albertson, Rochester, MN (US); Nicholas Ollerich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 17/656,685

(22) Filed: Mar. 28, 2022

(65) Prior Publication Data
US 2023/0308261 A1    Sep. 28, 2023

(51) Int. Cl.
*G06F 21/72* (2013.01)
*G06F 21/44* (2013.01)
(Continued)

(52) U.S. Cl.
CPC ............ *H04L 9/0825* (2013.01); *G06F 21/44* (2013.01); *G06F 21/62* (2013.01); *G06F 21/70* (2013.01); *G06F 21/71* (2013.01); *G06F 21/72* (2013.01); *H04L 9/0866* (2013.01); *H04L 9/0872* (2013.01); *H04L 9/14* (2013.01); *H04W 12/50* (2021.01)

(58) Field of Classification Search
CPC ....... H04L 9/08; H04L 9/0825; H04L 9/0866; H04L 9/0872; H04L 9/14; H04L 63/12; G06F 21/72; G06F 21/44; G06F 21/70
See application file for complete search history.

(56) References Cited

U.S. PATENT DOCUMENTS

| 7,234,058 B1 | 6/2007 | Baugher |
| 8,150,036 B2 | 4/2012 | Paykin |

(Continued)

FOREIGN PATENT DOCUMENTS

| CN | 106411504 A | 10/2020 |
| CN | 107579815 A | 11/2020 |

OTHER PUBLICATIONS

Decrypting Encrypted Bluetooth data with FTS4BT, https://wenku.baidu.com/view/ad9cf8b769dc5022aaea0068.

(Continued)

*Primary Examiner* — Shaqueal D Wade-Wright
(74) *Attorney, Agent, or Firm* — Kimberly Zillig (57) ABSTRACT

A system and method to tie a removable component to a host device. A first pairing key is stored into a security module on a host device such as a server rack. A removable component is inserted into the server rack for the first time. In response to this first insertion the first pairing key is burned into the removable component using a plurality of physically modifiable internal components. The server rack/security module receives a request form the removable component to operate on the server rack, the request includes a burned in pairing key. The security module compares the received pairing key with the first pairing key and permits operation of the removable component in response to a match between the received pairing key and the first pairing key.

25 Claims, 4 Drawing Sheets

(51) Int. Cl.

| | |
|---|---|
| *G06F 21/62* | (2013.01) |
| *G06F 21/70* | (2013.01) |
| *G06F 21/71* | (2013.01) |
| *H04L 9/08* | (2006.01) |
| *H04L 9/14* | (2006.01) |
| *H04W 12/50* | (2021.01) |

(56) References Cited

U.S. PATENT DOCUMENTS

| | | | |
|---|---|---|---|
| 8,583,915 B1* | 11/2013 | Huang | H04L 9/3234 |
| | | | 726/6 |
| 8,806,609 B2 | 8/2014 | Gladstone | |
| 9,092,969 B2 | 7/2015 | McCown | |
| 9,436,819 B2 | 9/2016 | Priev | |
| 9,674,162 B1 | 6/2017 | Miller | |
| 9,923,755 B2 | 3/2018 | Gulati | |
| 10,154,013 B1 | 12/2018 | Miller | |
| 10,635,826 B2 | 4/2020 | Aghdam | |
| 10,848,192 B2 | 11/2020 | Zalewski | |
| 10,855,321 B2 | 12/2020 | Zalewski | |
| 11,570,156 B2 | 1/2023 | Steffen | |
| 2008/0175381 A1 | 7/2008 | Drehmel | |
| 2010/0024001 A1 | 1/2010 | Campbell | |
| 2011/0087898 A1 | 4/2011 | Williams | |
| 2014/0292526 A1 | 10/2014 | Hansson | |
| 2015/0318874 A1 | 11/2015 | Donaldson | |
| 2017/0012770 A1* | 1/2017 | Lin | H04L 9/0891 |
| 2018/0039795 A1 | 2/2018 | Gulati | |
| 2018/0107844 A1* | 4/2018 | Brown | G06F 21/84 |
| 2018/0183581 A1* | 6/2018 | Elbaz | G09C 1/00 |
| 2019/0081803 A1 | 3/2019 | Gulati | |
| 2019/0229901 A1 | 7/2019 | Elbaz | |
| 2020/0106702 A1 | 4/2020 | Acharya | |
| 2021/0144141 A1 | 5/2021 | Lee | |
| 2022/0006796 A1 | 1/2022 | Steffen | |
| 2022/0131695 A1* | 4/2022 | Pike | H04L 9/14 |
| 2023/0318806 A1 | 10/2023 | Campbell | |

OTHER PUBLICATIONS

Encryption on Handheld Device with Remote Server Support, Sep. 7, 2011, IP.com, IPCOM000210519D.

Load Balancing VMware Horizon v1.1.3, Deployment Guide, loadbalancer.org.

Manisha Khond, Security Management and Features in IBM Sterling B2B Integrator and Sterling File Gateway, Oct. 25, 2017, IBM Commerce.

PCT/IB2021/055491, International Search Report and Written Opinion mailed Sep. 28, 2021.

Secure Computation Architecture for Client-side Encryption, Jul. 21, 2020, IP.com, IPCOM000263004D.

PCT/IB2023/051397, International Search Report and Written Opinion mailed Apr. 26, 2023.

\* cited by examiner

PAIRING DEVICES FOR ENHANCED SECURITY

BACKGROUND

The present disclosure relates to device security, more specifically to pairing removable components to a host device.

Removable components are easily moved from one location to another. In a secure environment the mobility of these components causes security risks for the operator as the devices can be intercepted and used in locations where the information that they contain is not intended. Further, devices are often stolen for the purpose of selling them to another user for illicit profits.

Embodiments of the present disclosure are directed to a system for pairing a removable component to a host device. The removable component is configured to be inserted into the host device. The system further includes a security module connected to the host device, the security module includes a least one pairing key. The at least one pairing key pairs the host device to the at least one removable component. The security module is configured to provide the at least one pairing key to the at least one removable component to pair the at least one removable component to the host device. The removable component includes a plurality of physically modifiable internal components (PMIC) disposed the at least one removable component, wherein each of the plurality of PMICs can only be modified one time, and a pairing key burner within the at least one removable component that is configured to modify the plurality of PMICs to create a binary representation of pairing key value between the at least one removable component and the host device. The security module further permits operation of the at least one removable component in response to a positive comparison of the at least one pairing key between the host device and the at least one removable component, and initiates a protection response in response to a negative comparison.

Embodiments of the present disclosure are directed to a method to tie a removable component to a host device. A first pairing key is stored into a security module on a host device such as a server rack. A removable component is inserted into the server rack for the first time. In response to this first insertion the first pairing key is burned into the removable component. The server rack/security module receives a request form the removable component to operate on the server rack, the request includes a burned in pairing key. The security module compares the received pairing key with the first pairing key and permits operation of the removable component in response to a match between the received pairing key and the first pairing key.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to device security, more specifically to pairing removable components to a host device or location. While the present disclosure is not necessarily limited to such applications, various aspects of the disclosure may be appreciated through a discussion of various examples using this context.

In secure computing situations it is important that the integrity of the physical hardware is maintained. However, in the current secure computing situations, it is possible to access the physical hardware at locations away from the intended use. For example, if someone with malicious intent removes a server from a data center, the information contained on servers remains vulnerable and can be read by booting up the server and decrypting the information. While some servers include tamper protection to protect against unauthorized physical intrusion into the secure computing areas, they do not protect against electronic intrusion and the like. In addition, when a server needs to be serviced, it is often removed from the rack and repaired at another location. When it is removed from the rack/data center, it could be vulnerable to attack during transit to/from/at the repair site. To combat this potential vulnerability, proposed the present disclosure introduces a method to pair a server to a rack, such that the server will not function if it is not in the proximity of the paired rack. While the present disclosure primarily discusses pairing a removable component to a rack, the principles disclosed herein can be applied to any other pairing of removable devices with a host device where use of the removable component is desired to be limited. For example, an auto manufacturer could tie components of the car to the actual car which could reduce car theft for car parts, or consumer electronics can be paired to a specific home.

Figure 1:
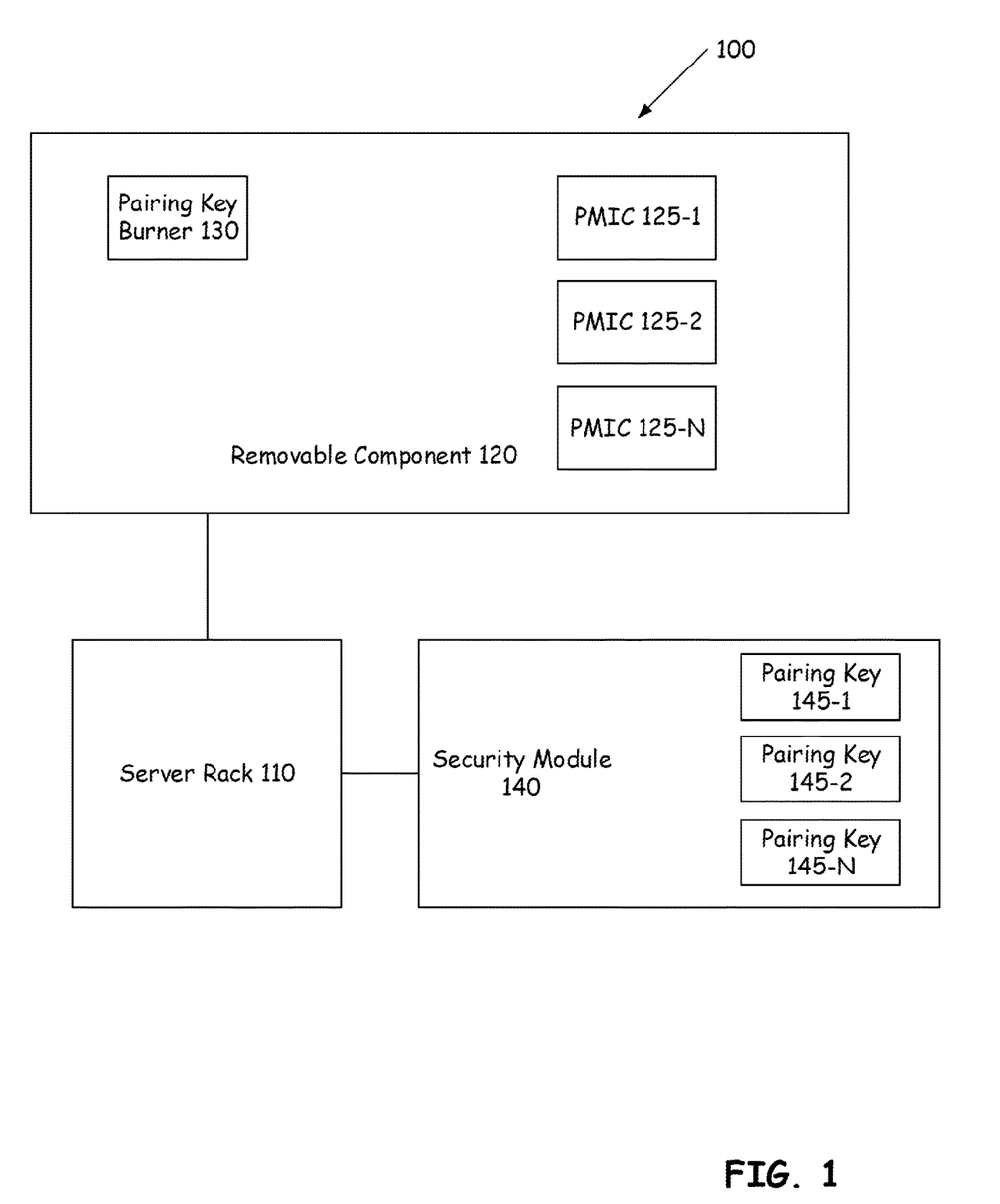
FIG. 1 is a block diagram of a system employing the pairing of a removable component to a host device according to illustrative embodiments.

FIG. 1 is a block diagram illustrating components of a secure computing environment according to embodiments of the present disclosure. Environment includes a server rack 110, a security control module, and at least one removable component 120.

The server racks 110 is a component of the environment that is configured to hold a number of removable components 120. In a secure computing environment the server racks 110 may be segregated from other server rack 110 in a data center. In this separation the server racks 110 can be separated from other racks in a non-secure portion of the data center by cages, fences, gates, and the like. In some approaches the secure servers can be held in a separate room from other servers in the data center. This separation is provided in many cases to prevent the access to the components or to ensure that the particular components are not moved from their intended locations. The server racks 110 includes a number of interface components that allow removable components 120 to be inserted and removed from the rack. The server racks 110 can also include features that enable the removable component 120 to communicate with the server racks 110 and/or the security module 140.

Components that are inserted into and out of the rack are sized according to a unit system called a rack unit "U" or "RU". A rack unit is equivalent to 1.75 inches (44.45 mm) in vertical height. A component is defined by its height in U. As an example, a component identified as being a 2U component would have a height of 3.5 inches. A typical server rack is a 42U server rack. However, other sizes of server racks exist and can be used.

The one or more removable components 120 are components of the environment that perform various functions for the server rack 110. These components can include, for example, patch panels, blanking panels, routers, switches, power supplies, rack mount servers, blade servers, storage servers and devices, etc.

The removable component 120 besides including circuitry, components, and programming to perform the desired functions of the removable component 120 it also includes a number of physically modifiable internal components 125-1, 125-2, . . . 125-N (collectively PMIC or PMICs 125) and a pairing key burner 130. These features are present in those removable components 120 for which an entity controlling them may desire the removable component 120 to be paired with the server rack 110 for added security.

A removable component 120 with a physically modifiable internal component (PMIC) can provide benefits over existing security techniques by ensuring that the removable component 120 is only usable in a designated location (e.g. specific server racks 110). The PMIC 125 is incorporated inside a portion of the removable component 120. In some embodiments, the PMIC 125 is implemented using eFuse, which is a technology for the dynamic real-time reprogramming of computer chips. eFuse has the benefit of once a "fuse" is burned, it can't be restored to its original state. However, in some embodiments PMIC 125 can be an array of e-Fuses or EEPROM through a logic circuit, or an EEPROM gated by an e-Fuse. When gated by an e-Fuse, the gate acts as a prevention mechanism to prevent modification of the data/image located past the e-Fuse gate.

The PMIC 125 of the removable component 120 is comprised of one or more breakable devices configured to cause an open circuit (e.g., a fuse, a wire, a conductive material with a defined brittleness). Each of the breakable devices may operate through a sacrificial operation, such as breaking. Before being broken, each breakable device is an electronic pathway through which current may flow from one end to another. Electricity can flow through continuously or in response to a request to verify the breakable device. If electricity reaches another end, the circuit is considered closed and the closed circuit may represent a value, such as a "1" or a "0". After being broken, each breakable device is broken such that current may no longer flow from one end to another. For example, the breakable device can be constructed of a fragile nature that severs or vaporizes in response to heat, current, or other relevant cause. If electricity does not reach another end, the circuit is considered open and the open circuit may represent a value, such as a '0' or a '1'. The value represented by an open or closed circuit is the opposite value. That is, for example, if the open circuit has a value of "1" then the closed circuit has a value of "0", and vice versa. The process of breaking the circuit can be performed by, for example, vaporizing, melting, burning, blowing, rupturing, physically modifying, or otherwise disrupting the flow of current through the particular circuit. Each of the breakable devices can operate by receiving an electrical current that causes the creation of the open circuit (e.g., an overcurrent, an excessive load).

The PMIC 125 can effectuate operation directly. In some embodiments, the PMIC 125 can include logic that reads the number of breakable devices and their current state. In some embodiments, the logic is not included in the PMIC 125. For example, the logic can be located within a sensor or computer housing the PMIC 125. In another example, the logic can be in a second integrated circuit and can be communicatively coupled to the PMIC 125 through logical traces of a circuit board or through a communication cable or other wire. In some embodiments, the PMIC 125 can apply a current directly to the breakable device. In some embodiments, the PMIC 125 can apply a current indirectly to a breakable device and applying a second current directly to the breakable device. In a first example, a first current is applied to a wire adjacent to a plurality of breakable devices causing the breakable devices to increase in temperature (e.g., heating). After heating, a second current is applied directly to one or more of the plurality of breakable devices causing one or more breakable devices to break, and consequently, creating one or more permanently open circuits. In some embodiments the current applied to the breakable devices in the PMIC 125 to cause the break is provided by an outside source. In this embodiment, the PMIC 125 does not have the internal ability to break any of the breakable devices. In this way the pattern of the breakable devices cannot easily be changed once the microcontroller 110 is programmed.

The pairing key burner 130 is a component of the removable that burns the pairing key 145 value received from the security module 140 into the removable component 120. The pairing key 145 is burned into the removable component 120 using the PMIC 125 portions of the removable component 120. The pairing key 145 value of the is converted to a binary value if not received from the security module 140 in a binary form. This binary value is then burned in by changing the broken/unbroken status of a number of the PMIC 125 such that the corresponding value represents the pairing key 145 value. For example, if a 256-bit pairing key 145 is used and the value is "120EA8A25E5D487BF68B5F7096440019" the corresponding binary representation of the pairing key 145 is:

00110001 00110010 00110000 01000101 01000001
00111000 01000001 00110010 00110101 01000101
00110101 01000100 00110100 00111000 00110111
01000010 01000110 00110110 00111000 01000010
00110101 01000110 00110111 00110000 00111001
00110110 00110100 00110100 00110000 00110000
00110001 00111001

To burn this value into the removable component 120, the removeable component needs to have to have at least 256 PMICs 125 available. The pairing key 145 then, depending on the method used for determining a "0" or a "1", burns the corresponding circuit to either open the circuit or close the circuit. However, the removable component 120 can have any number of PMICs 125 such that not all of the available PMICs 125 are used for the checksum. Further, the pairing key 145 can be any number of bits. However, the removable component 120 should have at least the number of PMICs 125 as the number of bits in the checksum.

The security control module is a component of the system that is configured to link the removable components 120 to the server racks 110. The security control module can also control the operation of the removable components 120 when they are connected to the server racks 110. In some embodiments, the security control module includes circuitry to control the various removable components 120. As such the security control module can regulate the ability for particular removable components 120 to receive power from the server racks 110, communicate with other components either within the server racks 110 or outside of the server racks 110, perform various functions, etc. That is the security control module has the ability to enforce particular security protocols on the removable component 120. In some embodiments the security control module includes programming to implement and manage the security controls. This programming can include features to send alerts or other notices to an administrator or other entity that provides information related to the installed removable components 120. These notices can for example include notices that a particular removable component 120 is inserted into the server racks 110, that particular removable components 120 have been validated, that a particular removable component 120 cannot be validated and remedial action is being taken, etc.

The security control module also includes at least one pairing key 145. The pairing key 145 is a key that is used to pair the removable component 120 to the server racks 110. By pairing the removable component 120 to the server racks 110 an additional layer of security can be provided to the operation and control of the removable component 120. The pairing key 145 can be any number of characters and can be encrypted when transmitted between the security control module and the removable component 120. In some embodiments, the security module 140 maintains a number of pairing keys 145. In this way not all of the removable components 120 would share the same pairing key 145. In some embodiments, the security module 140 includes enough pairing keys 145 to provide each removable component 120 its own unique pairing key 145. In situations where different removable components 120 are cycled through the server racks 110, such as for repairs, the security module 140 can include even more pairing keys 145 to ensure that there are sufficient pairing keys 145 available to maintain the uniqueness of the pairing keys 145 even when additional components are added to the server racks 110. When the pairing key 145 is assigned to the removable component 120, the security module 140 can identify which removable component 120 was assigned the particular pairing key 145. This way an administrator or other entity can query the security module 140 and determine which removable components 120 have been paired to the server racks 110.

When a new removable component 120 is first inserted into the server racks 110, a connection is formed between the removable component 120 and the security control module. This connection can be achieved through a communications cable connecting the removable component 120 to the security module 140/server racks 110, through communications transmitted through the power cable, through wireless communications protocols, or any other means of communication between the security module 140 and removable component 120. The security control module probes the removable component 120 to determine if the removable component 120 includes the ability to be paired to the server racks 110. In some embodiments, the security module 140 probes the removable component 120 to determine if the removable component 120 includes the PMIC, and if the number of PMIC is sufficient to hold the pairing key 145. In some embodiments, the security module 140 has pairing keys 145 of different sizes and can select a pairing key 145 for the removable component 120 based on the number of PMIC that are determined to be available for the pairing key 145.

The security module 140 is configured to select the pairing key 145 for the removable component 120. Once the pairing key 145 is selected the security module 140 transmits the pairing key 145 to the removable component 120, so that the pairing key 145 can be burned into the removable component 120. The value of the pairing key 145 can be transmitted to the removable component 120 as the actual key value or can be transmitted in binary form depending on the configuration of the removable component 120.

The security module 140 is configured to receive from the removable component 120 the burned in pairing key 145 and compare that value with the stored pairing key 145 for the removable component 120. When all the removable components 120 share the same pairing key 145 the security module 140 simply verifies that the received pairing key 145 matches the stored pairing key 145 value. When there are multiple pairing keys 145 the security module 140 can verify that the received key matches one of the stored pairing key 145 values. In some embodiments, the security module 140 can verify that the received pairing key 145 value is the value that was assigned to that particular removable component 120. In some embodiments, the security module 140 queries the removable component 120 for its pairing key 145. This can occur when the removable component 120 first powers on, or can be done at various times during the operation of the removable component 120 in the server racks 110. When the pairing key 145 does not match a stored value, the security module 140 can initiate a protection protocol for the removable component 120.

While the present disclosure describes the security module being located on the server rack, in some embodiments, the security module is located within the removable component. In this embodiment, when the removable component is inserted into the rack the security module contacts a second security module that is on the rack to receive a pairing key from the rack. The security module can periodically ping the second security module for the pairing key during operation and implement the security response if the pairing key is not received from the second security module.

Figure 2:
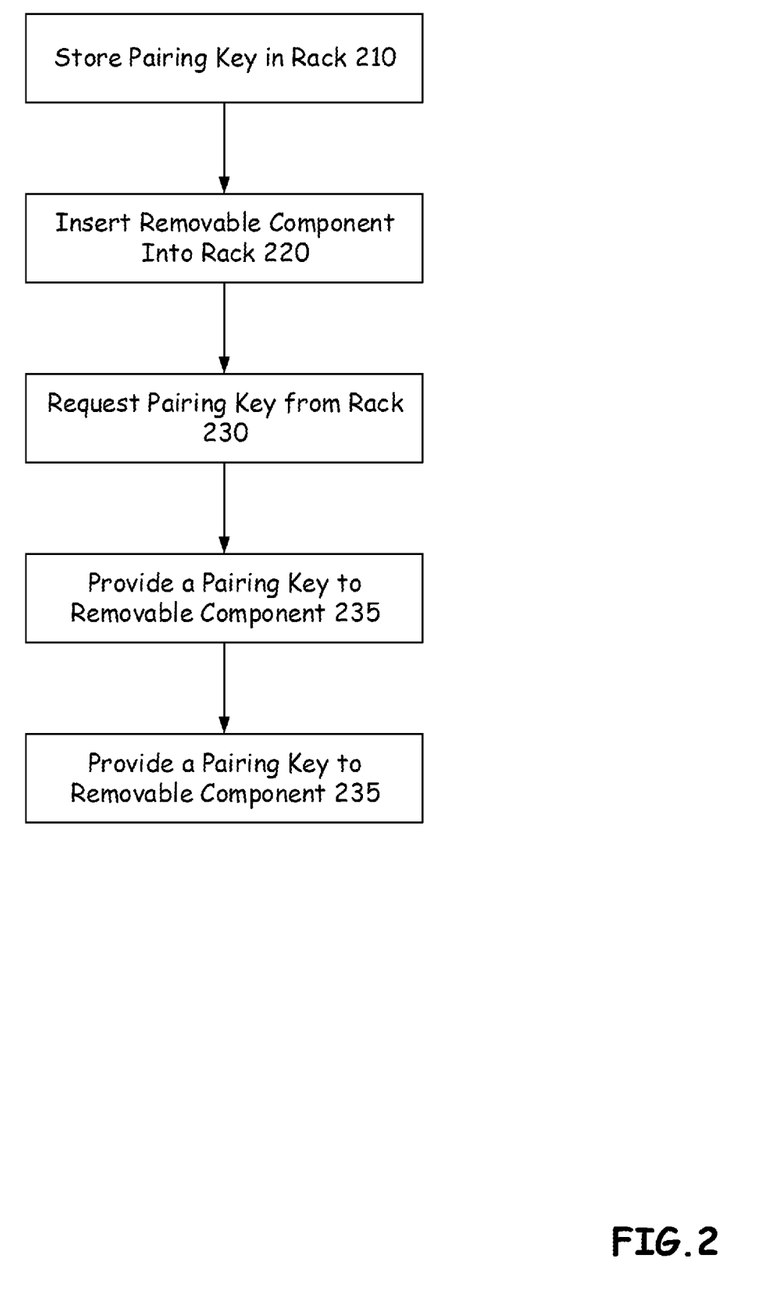
FIG. 2 is a flow diagram illustrating a process of how the system loads and burns in the pairing key values into the removable component according to illustrative embodiments.

FIG. 2 is a flow diagram illustrating a process for tying the removable component 120 to a server racks 110. While the present discussion discusses tying the removable component 120 to a server racks 110, the present process can be used to tie any removable component 120 to a receiving component. For example, any removable component 120 for an automobile can be tied to the specific automobile, a television could be tied to a particular house or other device, etc. By tying the devices to a particular location or item the value of the item to a third party is less and as such can reduce the likelihood that a particular item would be stolen from the location as it would not necessarily work outside the location.

The process begins by burning or storing a pairing key 145 into the server racks 110. This is illustrated at step 210. The pairing key 145 is burned or stored into the security module 140 of the server racks 110. The pairing key 145 is a specific key that is used to tie the server racks 110 to at least one removable component 120. This key is converted into a binary representation of the key's value. For example, if the key value is "120EA8A25E5D487BF68B5F7096440019" the corresponding binary representation of the pairing key 145 is:

00110001 00110010 00110000 01000101 01000001
00111000 01000001 00110010 00110101 01000101
00110101 01000000 00110100 00111000 00110111
01000010 01000110 00110110 00111000 01000010
00110101 01000110 00110111 00110000 00111001
00110110 00110100 00110100 00110000 00110000
00110001 00111001

This would be stored on the server racks 110 in the security module 140. If the pairing key 145 or keys are burned into the server racks 110, they can be burned in using the eFuse technique that is present in the removable component 120.

In some embodiments, the rack has multiple pairing keys 145. The use of multiple pairing keys 145 allows the rack to tie a removable component 120 to a specific location in the rack or can be used to prevent copying of the key to allow a different component to work in the server racks 110.

After the pairing key 145 has been burned into the server racks 110, a removable component 120 is inserted into the rack for the first time. This is illustrated at step 220. The removable component 120 can be inserted into any one of the mounting points that are present in the server racks 110. The removable component 120 is then communicatively coupled to the server racks 110 and the security module 140 on the rack. This connection includes a power cable and at least one cable that allows for communication between the removable component 120 and the security module 140. In some embodiments the power cable and the communications cable are the same. In some embodiments cables that are used for the normal operation of the removable component 120 are used for communication with the security module 140. In some embodiments the communications cable is replaced by wireless communication, such as WiFi, Bluetooth, Near Field Communications, etc.

Once the removable component 120 is installed into the server racks 110, the removable component 120 requests a pairing key 145 from the security module 140. This is illustrated at step 230. In some embodiments the security module 140 can detect the connection and installation of the removable component 120, determine that it does not have a pairing key 145 and push the pairing key 145 to the removable module. The request for the pairing key 145 can occur at the time the removable component 120 is first powered on by the server racks 110. However, in some embodiments, the request can be delayed to ensure that the removable component 120 is operating properly. In this way a faulty or otherwise defective removable component 120 is not tied to the server racks 110 and can be sent for repairs and used in another location. In some embodiments, the request simply indicates to the security module 140 that the removable component 120 is connected to the server racks 110. However, in other embodiments the request can include the location within the server racks 110 that the removable component 120 is installed. This location can be a specific number of rack units from the top/bottom of the rack the top/bottom of the removable component 120 is. In some embodiments, the location of the removable component 120 is determined by the specific cable that it is connected to. The cables can be a specific length suck that they can only plug into specific locations within the rack. In some embodiments, the specific location can be associated with a specific power cable that is used to power the removable component 120.

Following the request from the removable component 120 the security module 140 responds by providing the pairing key 145 to the removable component 120. This is illustrated at step 235. Again, the pairing key 145 can be generic for the rack as a whole, specific to a location within the rack, and/or specific for the removable component 120.

The removable component 120 responds to the received pairing key 145 by burning the pairing key 145 into it. This is illustrated at step 240. To write the pairing key 145 to the removable component 120, the burner 130 takes the pairing key 145 and then determines what PMICs on the removable component 120 need to be broken. In this way the burner 130 determines which PMICs 125 should have their corresponding value changed. Again, depending on how the system determines what a "0" or a "1" is will determine which particular PMICs need to be broken. The process of breaking the circuit can be performed by, for example, vaporizing, melting, burning, blowing, rupturing, physically modifying, or otherwise disrupting the flow of current through the particular circuit. Each of the PMICs can operate by receiving an electrical current that causes the creation of the open circuit (e.g., an overcurrent, an excessive load).

Figure 3:
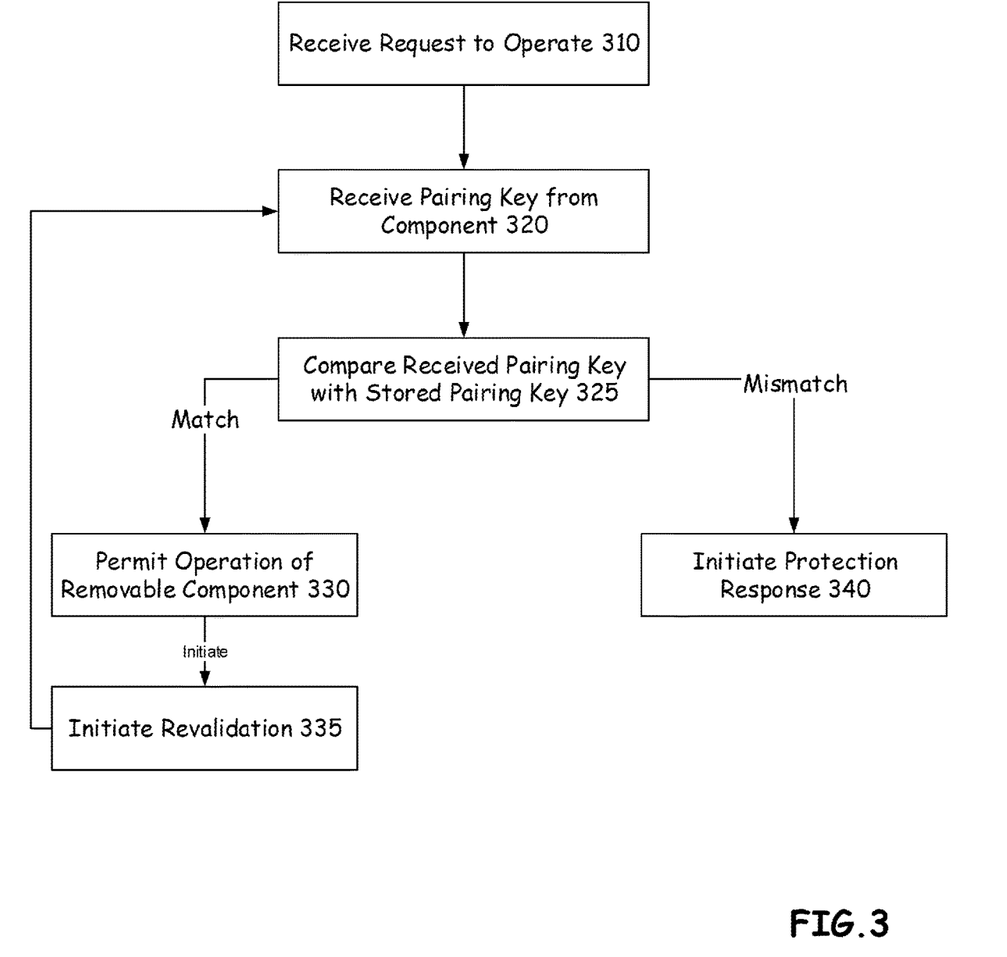
FIG. 3 is a flow diagram illustrating a process of how the system operates during normal operation according to illustrative embodiments.

FIG. 3 is a flow diagram illustrating a process for operating the removable component 120 on the server racks 110. If the removable component 120 has not previously been tied to the server racks 110, the process of FIG. 2 above is performed prior to starting the process of FIG. 3. The process begins when the security module 140 of the server racks 110 receives a request from the removable component 120 to operate on the server racks 110. This is illustrated at step 310. This request can come through the communication cable that connects the removable component 120 to the security module 140, or can come through other connections that the removable component 120 has to the security module 140. In some embodiments the request is generated when the removable component 120 first powers on using power provided by the server racks 110. However, in other embodiments, prior to receiving the external power, the removable component 120 can request permission to operate on the rack using internal power of the removable component 120. The request to operate on the server racks 110 includes the pairing key 145 that was assigned to removable component 120 at the time it was tied to the rack.

The security module 140 receives the pairing key 145 from the removable component 120 and compares that pairing key 145 with the pairing key 145 that was assigned to the removable component 120. This is illustrated at steps 320 and 325. Depending on whether the pairing key 145 matches or does not match the security module 140 can send different responses to the removable component 120.

If the pairing key 145 matches the assigned pairing key 145 the security module 140 permits operation of the removable component 120 on the server racks 110. This is illustrated at step 330. In some embodiments, the removable component 120 will not begin operation until it receives an indication from the security module 140 that the pairing key 145 was validated. The security module 140 can send an indication to the removable component 120 that pairing key 145 was validated. In some embodiments, the security module 140 will instruct the server racks 110 to provide power to the removable component 120 by turning on the power to the component through a power cable assigned to the removable component 120.

Once the pairing key 145 is validated the removable component 120 proceeds to operate as it was intended. However, in some embodiments, the security module 140 revalidates the removable component 120 during operation. This is illustrated at step 335. This revalidation is a means to ensure that the removable component 120 is where it is intended to be. For example, this can help ensure that the removable component 120 hasn't been powered up on the rack and then removed and taken to another location where it could be tampered with. This revalidation can, in some embodiments, be initiated by the security module 140. In this embodiment the security module 140 queries the removable component 120 for the pairing key 145. The removable component 120 provides the pairing key 145 as it did when it first requested operation on the rack. The system then repeats the validation process of step 320 and 325 above. In some embodiments, the removable component 120 periodically transmits its pairing key 145 to the security module 140 for validation. Again, repeating steps 320 and 325 above.

In the instance where the pairing key 145 does not match the security module 140 causes at least one protection response to be initiated. This is illustrated at step 340. The protection response can be implemented by the security module 140, the removable component 120, or both. In some embodiments the security module 140 issues an instruction to the server racks 110 to disconnect power from the removable component 120. This causes the removable component 120 to no longer have power for operation. In some embodiments, the security module 140 instructs the removable component 120 to initiate the protection response. In some embodiments the protection response is that the removable component 120 shuts itself down and no longer performs any functions. This protection response can be for example the removable component 120 initiating a process to destroy all of the data that is on the removable component 120. In some embodiments the removable component 120 may initiate a "self destruct" process that renders the removable component 120 inoperative. For example, this can include deleting/destroying the security keys, destroying the circuitry on the removable component 120 (such as through the use of an acid or burning fuses), erasing an ASIC on board the removable component 120, etc. The end result of such response is that removable component 120 is "bricked" and unable to ever function again.

Figure 4:
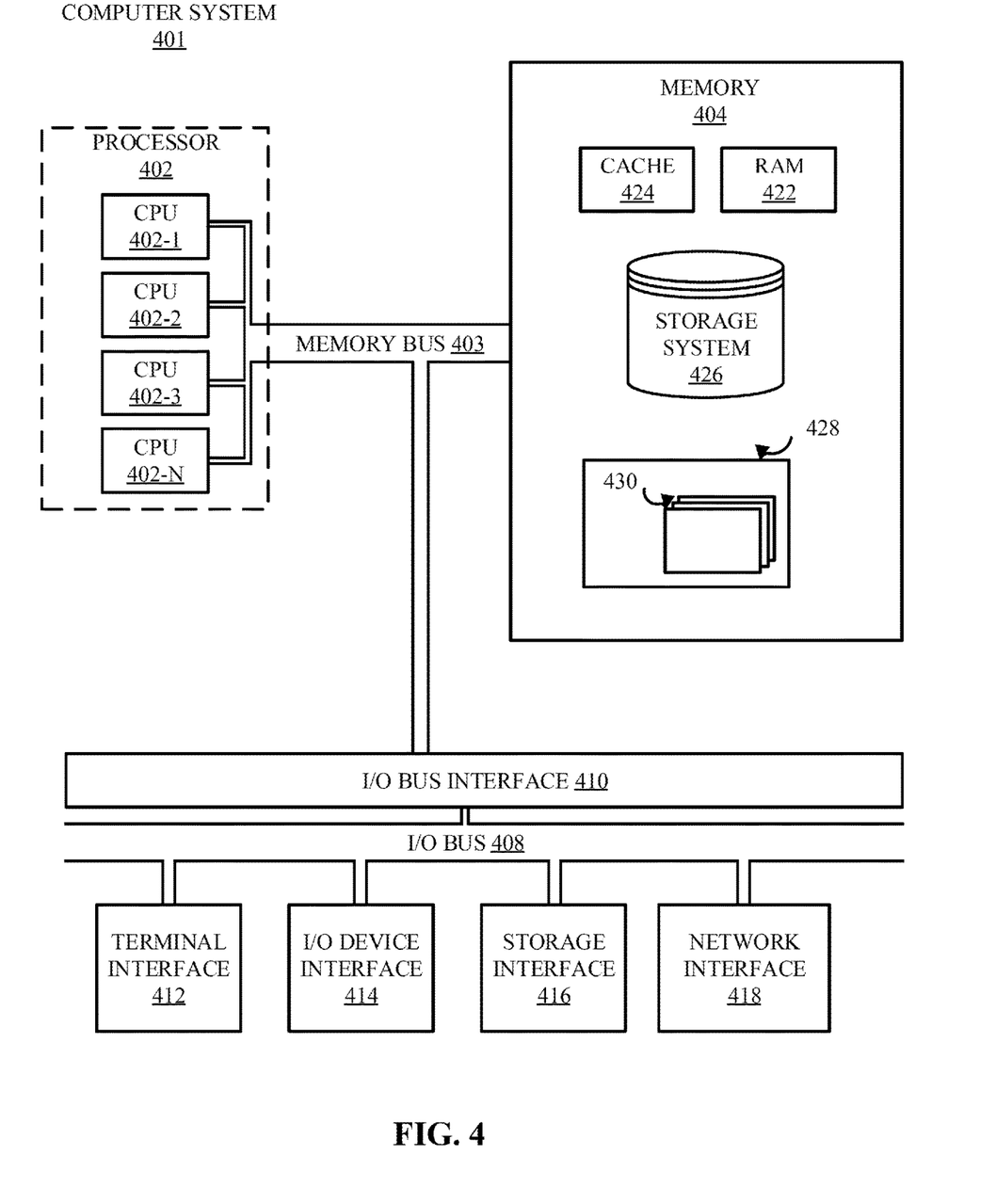
FIG. 4 is a block diagram illustrating a computing system according to one embodiment.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402-1, 402-2, 402-3, and 402-N, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 403 generally perform the functions or methodologies of various embodiments.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method to tie a removable component to a server rack, comprising:
storing a first pairing key into a security module of the server rack;
inserting the removable component into the server rack, wherein the removable component has not been paired with the server rack;
burning the first pairing key into the removable component;
receiving a request at the server rack from the removable component to operate on the server rack, the request including a burned in pairing key;
comparing by the security module the burned in pairing key with the first pairing key;
permitting operation of the removable component in response to a match between the burned in pairing key and the first pairing key; and
initiating revalidation of the removable component by the security module during operation to ensure that the removeable component is where it is intended to be in the server rack and was not tampered with.

2. The method of claim 1, wherein the first pairing key is burned into the removable component using eFuses.

3. The method of claim 1, further comprising:
in response to the burned in pairing key not matching the first pairing key, transmitting a message to the removable component, the message instructing the removable component to initiate a protection response.

4. The method of claim 3, wherein the protection response causes the removable component to become inoperative.

5. The method of claim 3, wherein the protection response causes the removable component to destroy all data on the removable component.

6. The method of claim 1, further comprising:
burning into the server rack a plurality of pairing keys, each of the plurality of pairing keys associated with a different removable component associated with the server rack.

7. The method of claim 6, wherein each of the plurality of pairing keys is associated with a specific location within the server rack.

8. The method of claim 7, wherein the request includes the specific location within the server rack of the removable component.

9. The method of claim 1, further comprising:
querying, periodically, by the security module the removable component for the burned in pairing key.

10. The method of claim 1, further comprising:
transmitting, periodically, by the removable component the burned in pairing key to the security module.

11. The method of claim 10, further comprising:
receiving a confirmation message from the removable component in response to the burned in pairing key matching the first pairing key; and
continuing operation of the removable component.

12. The method of claim 10, further comprising:
receiving an indication that the burned in pairing key and the first pairing key did not match; and
initiating a protection response, by the removable component, in response to the indication.

13. The method of claim 1, wherein storing the first pairing key further comprises:
burning the first pairing key into the security module.

14. The method of claim 13, wherein the first pairing key is burned into the security module using eFuses.

15. A system comprising:
a host device;
at least one removable component, the at least one removable component configured to be inserted into the host device; and
a security module connected to the host device, the security module having at least one pairing key, the at least one pairing key pairing the host device to the at least one removable component, the security module configured to provide the at least one pairing key to the at least one removable component to pair the at least one removable component to the host device, the security module further configured to permit operation of the at least one removable component in response to a positive comparison of the at least one pairing key between the host device and the at least one removable component, the security module further configured to initiate revalidation of the removable component during operation to ensure that the removeable component is where it is intended to be in the host device and was not tampered with.

16. The system of claim 15, further comprising:
a plurality of physically modifiable internal components (PMIC) disposed within the at least one removable component, wherein each of the plurality of PMICs can only be modified one time; and
a pairing key burner disposed within the at least one removable component configured to modify the plurality of PMICs to create a binary representation of pairing key value between the at least one removable component and the host device.

17. The system of claim 15, wherein the security control module is further configured to initiate a protection response in response to a negative comparison of the at least one pairing key between the host device and the at least one removable component.

18. The system of claim 17, wherein the protection response causes the at least one removable component to render itself inoperable.

19. The system of claim 17, wherein the protection response causes the host device to not provide power to the at least one removable component.

20. The system of claim 15, wherein the security module is configured to periodically revalidate the at least one pairing key between the at least one removable component and the host device.

21. The system of claim 15, wherein the host device is a server rack.

22. The system of claim 15, wherein each removable component of the at least one removable component is provided with a unique pairing key of the at least one pairing key.

23. The system of claim 15, wherein the at least one pairing key ties the at least one removable component to a specific location within the host device.

24. A computer readable storage medium having computer executable instructions to tie a removable component to a host device that when executed cause at least one computing device to:
store a first pairing key into a security module of the host device;
burn the first pairing key into a removable component upon a first insertion of the removable component into the host device, wherein the first pairing key is burned into a plurality of physically modifiable internal components (PMIC) disposed within the removable component, wherein each of the plurality of PMICs can only be modified one time;

receive a request at the host device from the removable component to operate on the host device, the request including a burned in pairing key;

compare by the security module the burned in pairing key with the first pairing key;

permit operation of the removable component in response to a match between the burned in pairing key and the first pairing key; and initiate revalidation of the removable component by the security module during operation to ensure that the removeable component is where it is intended to be in the host device and was not tampered with.

25. The computer readable storage medium of claim 24, further comprising instructions to:

in response to the burned in pairing key not matching the first pairing key, transmit a message to the removable component, the message instructing the removable component to initiate a protection response.

* * * * *